United States Patent
Wood

(10) Patent No.: US 10,962,723 B2
(45) Date of Patent: Mar. 30, 2021

(54) CONNECTORS FOR COMPOSITE FIBER OPTIC/COAXIAL CABLES AND RELATED CONNECTORIZED CABLES AND METHODS

(71) Applicant: CommScope, Inc. of North Carolina, Hickory, NC (US)

(72) Inventor: Kenneth S. Wood, Elmira, NY (US)

(73) Assignee: CommScope, Inc. of North Carolina, Hickory, NC (US)

( * ) Notice: Subject to any disclaimer, the term of this patent is extended or adjusted under 35 U.S.C. 154(b) by 54 days.

(21) Appl. No.: 15/790,808

(22) Filed: Oct. 23, 2017

(65) Prior Publication Data
US 2018/0045896 A1 Feb. 15, 2018

Related U.S. Application Data

(62) Division of application No. 14/317,313, filed on Jun. 27, 2014, now abandoned.

(60) Provisional application No. 61/857,891, filed on Jul. 24, 2013.

(51) Int. Cl.
*G02B 6/38* (2006.01)

(52) U.S. Cl.
CPC ......... *G02B 6/3817* (2013.01); *G02B 6/3887* (2013.01); *G02B 6/3897* (2013.01); *Y10T 29/49123* (2015.01)

(58) Field of Classification Search
CPC ... G02B 6/3817; G02B 6/3887; G02B 6/3897
See application file for complete search history.

(56) References Cited

U.S. PATENT DOCUMENTS

| | | | |
|---|---|---|---|
| 4,118,594 A | 10/1978 | Arnaud | |
| 4,158,478 A | 6/1979 | D'Auria et al. | |
| 4,416,508 A | 11/1983 | Dey et al. | |
| 4,695,127 A | 9/1987 | Ohlhaber et al. | |
| 4,723,832 A | 2/1988 | Okazato et al. | |
| 4,763,981 A | 8/1988 | Wilkins | |
| 4,834,675 A | 5/1989 | Samchisen | |
| 4,896,939 A * | 1/1990 | O'Brien | G02B 6/3816 174/110 R |
| 5,015,061 A * | 5/1991 | Giannini | G02B 6/3817 385/56 |
| 5,125,062 A | 6/1992 | Marlier et al. | |
| 5,150,442 A | 9/1992 | Desmons | |
| 5,189,718 A | 2/1993 | Barrett et al. | |
| 5,222,173 A | 6/1993 | Bausch | |
| 5,268,971 A | 12/1993 | Nilsson et al. | |
| 5,293,678 A | 3/1994 | Chamberlain et al. | |
| 5,371,823 A | 12/1994 | Barrett et al. | |
| 5,418,878 A | 5/1995 | Sass et al. | |
| 5,467,420 A | 11/1995 | Rohrmann et al. | |
| 5,468,913 A | 11/1995 | Seaman et al. | |
| 5,473,715 A | 12/1995 | Schofield et al. | |
| 5,555,338 A | 9/1996 | Haag et al. | |
| 5,557,698 A | 9/1996 | Gareis et al. | |
| 5,574,815 A * | 11/1996 | Kneeland | G02B 6/3817 174/70 R |

(Continued)

*Primary Examiner* — Chris H Chu
(74) *Attorney, Agent, or Firm* — Merchant & Gould P.C.

(57) ABSTRACT

A connector for a composite communications cable includes a connector body, a contact post mounted within the connector body, a compression sleeve that is received within a rear end of the connector body and an optical fiber passage at a front end of the connector.

10 Claims, 13 Drawing Sheets

(56) References Cited

U.S. PATENT DOCUMENTS

| | | | | |
|---|---|---|---|---|
| 5,666,453 | A * | 9/1997 | Dannenmann | G02B 6/3895 |
| | | | | 385/100 |
| 5,745,627 | A * | 4/1998 | Arroyo | G02B 6/4415 |
| | | | | 174/121 A |
| 5,777,260 | A | 7/1998 | Klumps et al. | |
| 6,343,172 | B1 * | 1/2002 | Schiestle | G02B 6/4416 |
| | | | | 385/101 |
| 6,530,807 | B2 * | 3/2003 | Rodrigues | H01R 9/0521 |
| | | | | 439/578 |
| 6,859,590 | B1 | 2/2005 | Zaccone et al. | |
| 7,200,305 | B2 | 4/2007 | Dion et al. | |
| 8,618,418 | B2 * | 12/2013 | Amato | H01B 7/1875 |
| | | | | 174/106 R |
| 2002/0126967 | A1 * | 9/2002 | Panak | G02B 6/4405 |
| | | | | 385/101 |
| 2003/0016916 | A1 * | 1/2003 | Allen | G02B 6/3816 |
| | | | | 385/55 |
| 2005/0002621 | A1 * | 1/2005 | Zimmel | G02B 6/4471 |
| | | | | 385/100 |
| 2007/0249193 | A1 * | 10/2007 | Penumatcha | H01R 43/20 |
| | | | | 439/125 |
| 2011/0033155 | A1 * | 2/2011 | Daikuhara | G02B 6/3817 |
| | | | | 385/72 |
| 2013/0072048 | A1 * | 3/2013 | Schafer | H01R 13/622 |
| | | | | 439/372 |
| 2013/0209043 | A1 * | 8/2013 | Norris | G02B 6/3887 |
| | | | | 385/80 |
| 2013/0336623 | A1 | 12/2013 | Chamberlain et al. | |

* cited by examiner

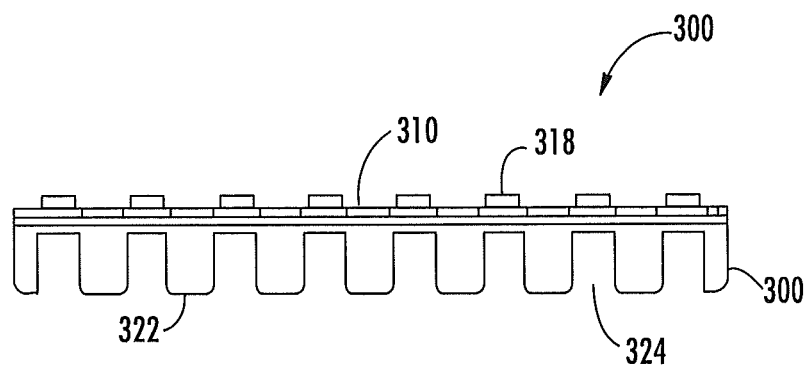
FIG. 12
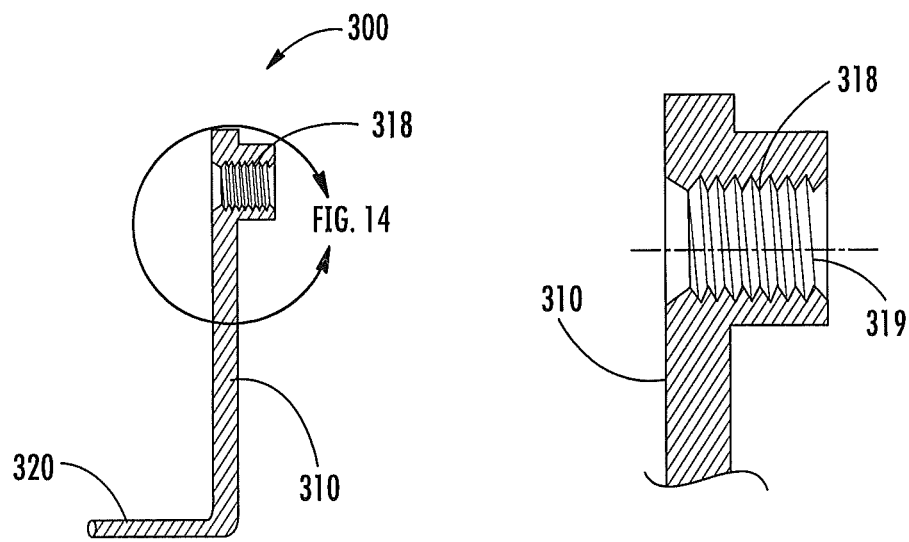
FIG. 13
FIG. 14

CONNECTORS FOR COMPOSITE FIBER OPTIC/COAXIAL CABLES AND RELATED CONNECTORIZED CABLES AND METHODS

CROSS-REFERENCE TO RELATED APPLICATION

The present application is a divisional of U.S. patent application Ser. No. 14/317,313, filed Jun. 27, 2014 which claims priority under 35 U.S.C. § 119 to U.S. Provisional Patent Application Ser. No. 61/857,891, filed Jul. 24, 2013. The contents of each application is incorporated by reference herein in their entireties.

FIELD OF THE INVENTION

The present invention relates to composite communications cables and, more particularly, to systems, methods and components for connectorizing composite communications cables that include a coaxial transmission component and a fiber optic transmission component.

BACKGROUND

Coaxial cables are a known type of electrical cable that may be used to carry radio frequency ("RF") signals. Coaxial cables are widely used as transmission lines in cable television networks. FIG. 1 is a schematic perspective view of a conventional coaxial cable 10 that has been partially cut apart to reveal its internal structure. As shown in FIG. 1, the coaxial cable 10 has a center conductor 12 that is surrounded by a dielectric spacer 14. A tape 16 may be bonded to the outside surface of the dielectric spacer 14. A metallic electrical shield 18, which typically comprises braided shielding wires and, optionally, one or more electrical shielding tapes (not shown in FIG. 1), surrounds the center conductor 12, dielectric spacer 14 and tape 16. The electrical shield 18 serves as an outer conductor of the coaxial cable 10. Finally, a cable jacket 20 surrounds the electrical shield 18 to complete the coaxial cable 10.

Fiber optic cables are also well known in the art. Fiber optic cables typically include one or more optical fibers, one or more strength members such as, for example, aramid fibers or other strength yarns, and a protective outer jacket. FIG. 2 is a cross-sectional view of a conventional fiber optic cable 32. As shown in FIG. 2, the fiber optic cable 32 includes a glass (silica) core 34, a glass cladding 36, and a protective coating 38 that is typically a polymer layer such as an acrylic or other plastic layer that is integral with the core 34 and cladding 36. A jacket 40 surrounds and protects the optical fiber 32. While not shown in FIG. 2, it will be appreciated that additional components are routinely included in fiber optic cables such as strength yarns, buffer tubes, additional optical fibers, etc. A wide variety of fiber optic communications cables are known in the art, including ribbon cables, loose tube cables, cables that include a single optical fiber, cables that include multiple optical fibers, etc.

Optical fibers typically include a glass core 34 and glass cladding 36 that may be easily damaged if the cable is bent at too tight of an angle or otherwise subjected to excessive force, and hence fiber optic cables tend to be much more susceptible to damage than are coaxial cables. As such, fiber optic cables routinely include strength members such as fiberglass or aramid fibers that protect the optical fibers, and often also include buffer tubes which protect the optical fibers and/or allow the optical fibers to move relative to the other components of the cable. Optical fibers that can move relative to the buffer tube are referred to as "loosely-buffered" optical fibers, whereas "tightly-buffered" optical fibers are optical fibers that include a plastic (or other) material that is extruded directly onto the optical fiber (e.g., onto an acrylate coating of the optical fiber) such that the buffer layer is bonded to the optical fiber and forms an integral structure therewith. The buffer layer that is provided on a tightly-buffered optical fiber is typically about 250-325 microns thick, and the overall diameter of a tightly-buffered optical fiber (including the buffer layer) may be, for example, about 900 microns.

Cable television networks refer to communications networks that are used to transmit cable television signals and signals relating to other services such as broadband Internet and/or Voice-over-Internet Protocol ("VoIP") telephone service between a service provider and a plurality of subscribers. Typically, the service provider is a cable television company that may have exclusive rights to offer cable television services in a particular geographic area. The subscribers in a cable television network may include, for example, individual homes, apartments, hotels, businesses, schools, government facilities and various other entities.

Most conventional cable television networks comprise hybrid fiber-coaxial networks. In these networks, fiber optic cables are typically used to carry signals from the headend facilities of the service provider to various distribution points. These fiber optic cables may support very high bandwidth communications, and thus may provide an efficient mechanism for distributing signals throughout a service area. However, fiber optic cabling and the related equipment that are used to transmit optical signals can be substantially more expensive than coaxial cable and the related equipment that is used to transmit electrical RF signals throughout a cable television network. Consequently, less expensive coaxial cable is typically used at least in the so-called "drop" sections of a cable television network in order to carry the signals into neighborhoods and/or into individual homes, apartment complexes, businesses and other subscriber premises. Electronic interface units are located throughout the cable television networks that are used convert the optical signals into electrical signals and vice versa.

SUMMARY

Pursuant to embodiments of the present invention, connectors for composite communications cables are provided. The composite communications cables may include both a coaxial component and a fiber optic component. The connectors according to embodiments of the present invention may include a connector body, a contact post mounted within the connector body that is configured to receive both a center conductor of the coaxial component and an optical fiber of the fiber optic component, a compression sleeve that is received within a rear end of the connector body, and an optical fiber passage at a front end of the connector body.

In some embodiments, a front end of the connector body may include external threads, and the connector may also include a jam nut that is received on the external threads to mount the connector on a mounting structure. A pair of D-flats may be provided in the external threads. The optical fiber passage may have at least one external protrusion, and a furcation tube may extend from a front end of the optical fiber passage. Moreover, a heat shrinkable material may be installed over the external protrusion of the optical fiber passage and over at least a portion of the furcation tube. The optical fiber passage may include a first channel that is configured to receive the optical fiber and a second channel that is configured to receive the center conductor. In such embodiments, the above-mentioned furcation tube may extend from a front end of the optical fiber passage, and the center conductor may extend through both the optical fiber passage and the furcation tube.

In some embodiments, the connectors according to embodiments of the present invention may be provided in combination with the composite communications cable. In such embodiments, the center conductor of the coaxial component may extend into the contact post, and an insulative cap may be installed on the center conductor. The composite communications cable may also include a dielectric spacer that substantially surrounds the center conductor, an outer conductor that substantially surrounds the dielectric spacer, and a jacket that surrounds the outer conductor. The optical fiber may be a non-buffered optical fiber positioned between the center conductor and the dielectric spacer, and an outer surface of the non-buffered optical fiber may be within 50 microns of the outer surface of the center conductor.

Pursuant to further embodiments of the present invention, ground plates are provided that include a base plate and a mounting plate extending upward from the base plate, the mounting plate including a plurality of slots aligned in a row. The base plate may include a plurality of fingers, each of which includes a threaded aperture.

Pursuant to still further embodiments of the present invention, methods of upgrading a coaxial cable cabling connection to a fiber optic cabling connection are provided in which a coaxial connector is removed from a first end of a composite communications cable. Portions of a jacket, an outer conductor and a dielectric spacer of the composite communications cable are then removed from the first end of the composite communications cable so that a first end portion of an optical fiber of the composite communications cable extends beyond first end portions of the jacket, outer conductor and dielectric spacer. The first end portion of the outer conductor is folded back onto the first end portion of the jacket. The first end of the composite communications cable is inserted into a compression connector so that the first end portion of the optical fiber extends through an optical fiber passage of the compression connector. A compression sleeve of the compression connector is compressed to lock the composite communications cable in place inside the compression connector.

In some embodiments, the compression connector may include a connector body and a contact post mounted within the connector body that is configured to receive both a first end portion of a center conductor of the composite communications cable and the first end portion of the optical fiber. In such embodiments, the optical fiber passage may extend from a front end of the connector body and the compression sleeve may be received within a rear end of the connector body. The front end of the connector body may include external threads, and a jam nut may be threaded onto the external threads to mount the compression connector on a mounting structure. The optical fiber passage may include at least one external protrusion, and a furcation tube may be mounted onto a front end of the optical fiber passage. A heat shrinkable material may be installed over the external protrusion of the optical fiber passage and over at least a portion of the furcation tube. The outer conductor of the composite communications cable may provide strain relieve once the composite communications cable is locked in place inside the compression connector.

BRIEF DESCRIPTION OF THE DRAWINGS

FIG. 12 is a front view of the ground plate of FIG. 10.

FIG. 13 is a cross-sectional view taken along the line 13-13 of FIG. 10.

FIG. 14 is an enlarged view of a top portion of the cross-sectional view of FIG. 13.

DETAILED DESCRIPTION

Figure 1:
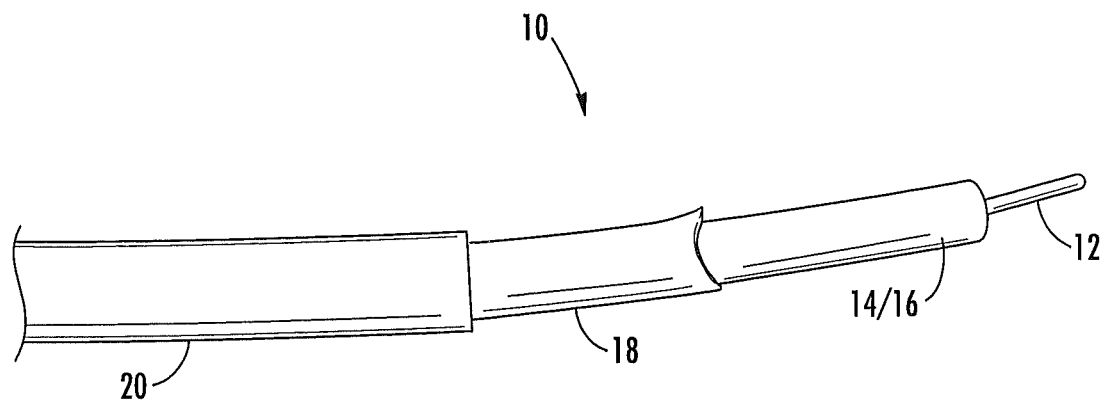
FIG. 1 is a side partially cut-away view of a conventional coaxial cable.
Figure 2:
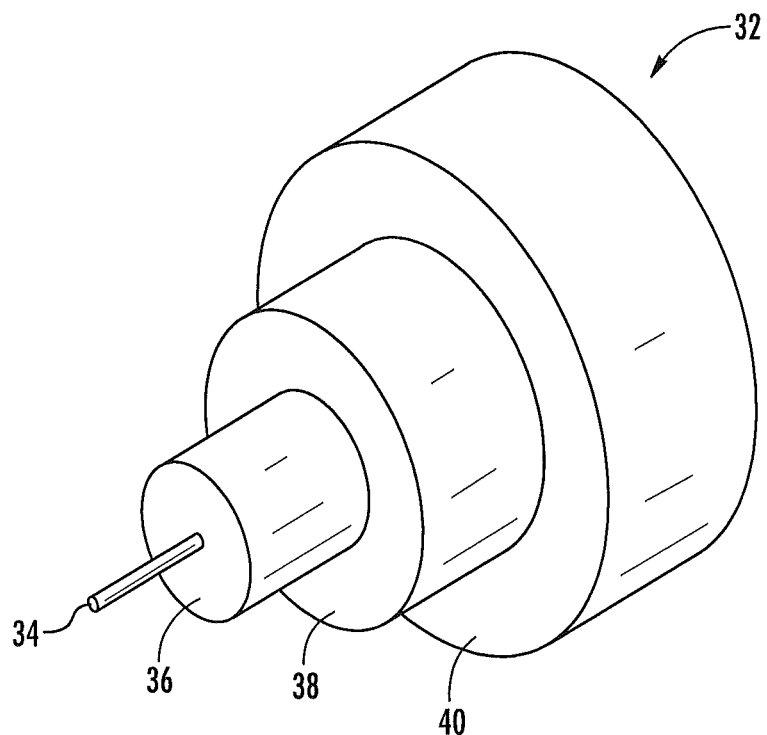
FIG. 2 is a perspective, partially cut-away view of a conventional fiber optic communications cable.

With the proliferation of the number of cable television channels that are typically offered and the ever-expanding use of the Internet, including large scale streaming of movies and television shows, the bandwidth requirements of individual cable television and broadband Internet subscribers has increased significantly in recent years. In order to provide high-speed Internet connectivity and other bandwidth intensive services to individual subscribers, there has been considerable interest in so-called "fiber-to-the-home" or "FTTH" deployments in which the signals from the service provider are carried as optical signals all the way to each individual subscriber premise, where the signals are (typically) converted to electrical RF signals for distribution within the subscriber premise to one or more end devices such as television sets, cable boxes, cable modems and the like. Likewise, upstream signals from individual subscriber premises to the head end of the cable television network may be transmitted as optical signals, allowing for significantly higher upstream data rates.

Unfortunately, to date it has been found that fiber-to-the-home deployments are not economically feasible, as most consumers are unwilling to pay the substantial increase in monthly fees that would be required to support the increased cost of deploying optical fibers all the way to individual subscriber premises. Currently, the primary cost issue is the optical-to-electronic interface unit, which is typically referred to as a "node" when deployed within a hybrid fiber-coaxial network and is often referred to as a micronode or network interface unit when deployed at an individual subscriber premises (e.g., homes).

While fiber-to-the-home service is not currently economically feasible for most cable television service providers, it may become so in the future as the bandwidth requirements of individual subscribers increase and/or as the cost of fiber optic cabling and equipment decreases as compared to coaxial cable and equipment. However, if and when such changes occur, it may be cost prohibitive to retrofit existing cable television networks to have fiber-to-the-home deployments as the cost of reinstalling the cabling may far exceed the cost of the additional fiber optic cabling and equipment that would be necessary for a fiber-to-the-home deployment.

U.S. patent application Ser. No. 13/523,185, filed Jun. 14, 2012 ("the '185 application"), the entire content of which is hereby incorporated by reference herein, discloses composite communications cables that include both a coaxial transmission component and a fiber optic transmission component within a single cable structure. The composite communications cables that are disclosed in the '185 application may be deployed as drop cables in cable television networks that currently transmit signals to and from individual subscriber premises as radio frequency ("RF") signals over coaxial cables such that the optical fibers that are embedded in the cables initially are unused. Later, if the RF tap units of the network are replaced with optical tap units and optical network units are installed at the subscriber premises, the composite communications cables of the '185 application that are used as drop cables can be re-connectorized to act as fiber optic cables to provide high bandwidth fiber optic connections directly to the subscriber premises.

The '185 application discloses various composite communications cables that include one or more optical fibers that are positioned just outside the center conductor of a conventional coaxial cable. In example embodiments, an outer surface of the optical fiber(s) may be in direct contact with an outer surface of the center conductor and/or may be within 50 microns of the outer surface of the center conductor. By placing the optical fiber(s) just outside the center conductor, the bending stresses and strains on the optical fibers may be kept within industry acceptable levels, even when unbuffered and/or tightly buffered optical fibers are used.

Figure 3:
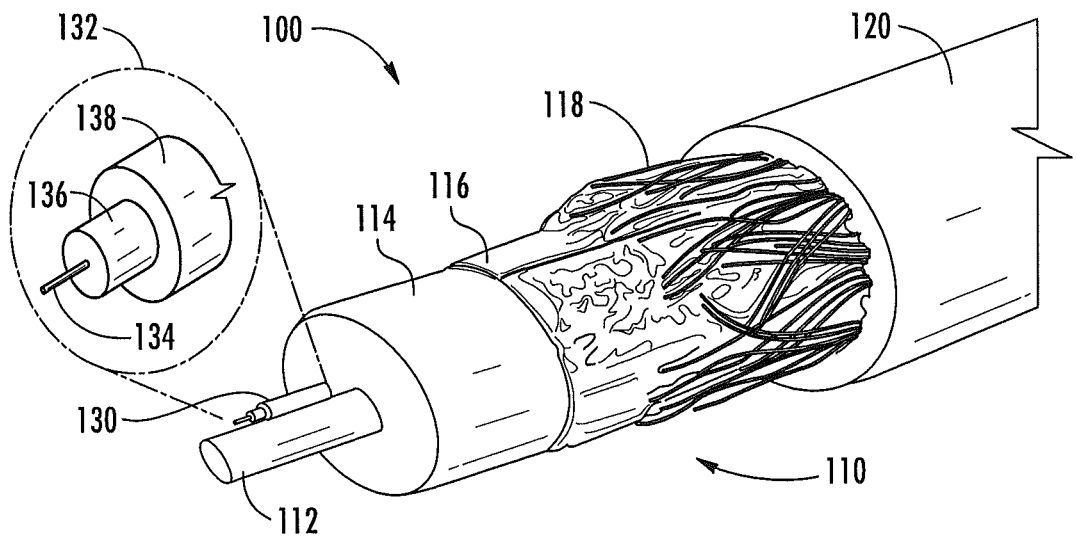
FIG. 3 is a perspective, partially cut-away view of a composite communications cable that may be connectorized using the connectors and methods according to embodiments of the present invention.
Figure 4:
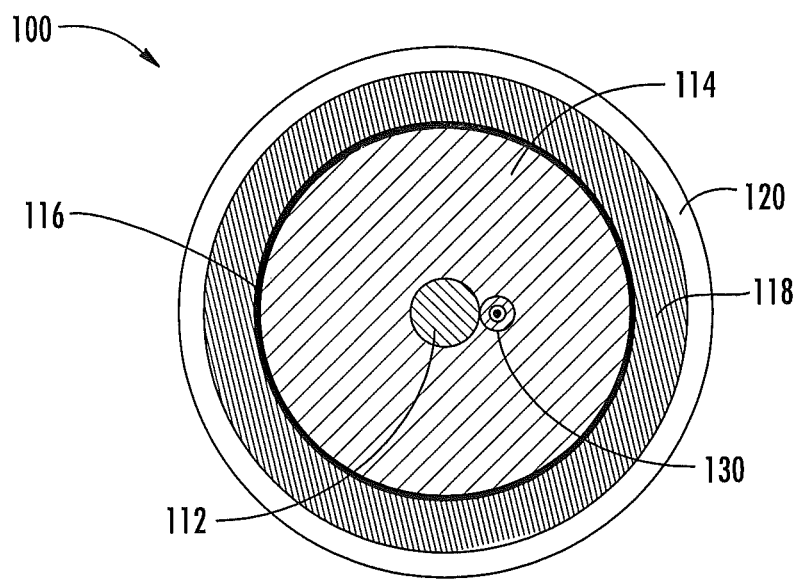
FIG. 4 is a transverse cross-sectional view of the composite communications cable of FIG. 3.

FIGS. 3 and 4 are a perspective, partially cut-away view and a transverse cross-sectional view, respectively, of a composite communications cable 100 that is disclosed in the '185 application. The composite communications cable 100 may be connectorized using the connectors and methods according to embodiments of the present invention.

As shown in FIGS. 3 and 4, the composite communications cable 100 may extend in a "longitudinal" direction, and may have a generally round transverse cross-section. The cable 100 includes a center conductor 112 (e.g., an 18 gauge copper wire) that is surrounded by a dielectric spacer 114. The dielectric spacer 114 may comprise a solid spacer that is formed of, for example, plastic, or may comprise a rigid foamed spacer (e.g., foamed plastic). The dielectric spacer 114 may have an annular cross-section and may define a longitudinal channel for the center conductor 112. A conductive tape 116 is provided on the outer surface of the dielectric spacer 114. A metallic electrical shield 118 (which is also referred to herein as the "outer conductor" 118 of the composite cable 100), which may comprise, for example, a plurality of braided shielding wires, surrounds the dielectric spacer 114 and the conductive tape 116. A cable jacket 120 surrounds the electrical shield 118. One or more electrical shielding tapes (not shown) may also surround the electrical shield 118 inside the jacket 120. The center conductor 112, dielectric spacer 114, the electrical shield 118 and any tapes together comprise a coaxial transmission component 110 of composite cable 100.

The composite communications cable 100 further includes a fiber optic transmission component 130. In the embodiment of FIGS. 3 and 4, this fiber optic transmission component 130 comprises a non-buffered or "bare" optical fiber 132 having a core 134, a cladding 136 and a coating layer 138 (e.g., one or more protective polymer layers such as ultra-violet light-cured acrylate layers) that are concentrically disposed. The optical fiber 132 may extend in the longitudinal direction in parallel to the center conductor 112 and may be in direct contact with the outer surface of the center conductor 112 or run parallel to the center conductor 112 with a small spacing (less than 50 microns) therebetween. In other embodiments, the optical fiber transmission component 130 may be helically wound about the center conductor 112 or configured in some other manner such that it does not run parallel to the center conductor 112. It will also be appreciated that more than one optical fiber 132 may be provided for redundancy and/or increased bandwidth. When more than one optical fiber 132 is provided, the optical fibers 132 may or may not be positioned next to each other (for example, in a two optical fiber embodiment the optical fibers 132 could be positioned 180 degrees apart on either side of the center conductor 112).

Figure 4A:
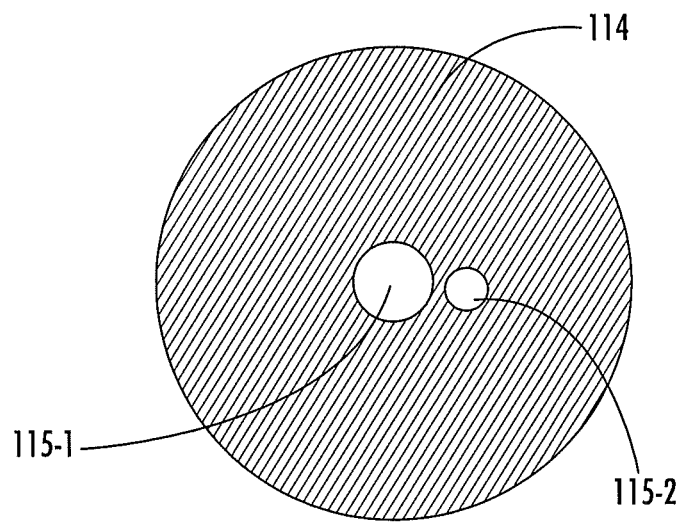
FIGS. 4A and 4B are transverse cross-sectional views of modified versions of the composite communications cable of FIG. 3.
Figure 4B:
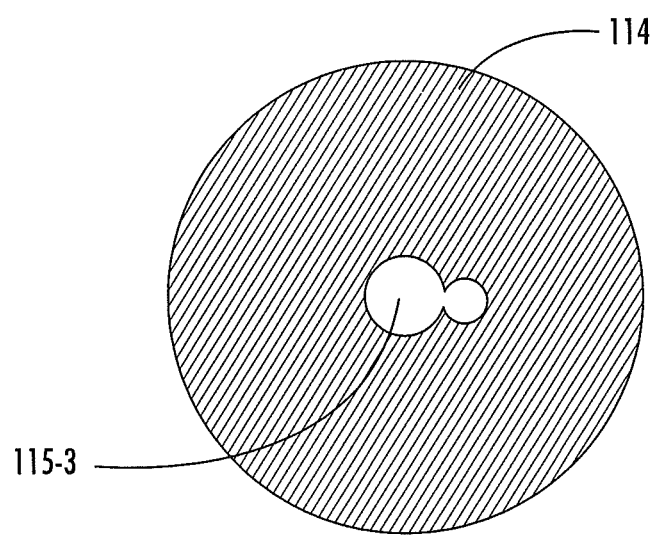

In some embodiments, the overall diameter of the optical fiber 132 may be from about 235 to about 265 μm. In some embodiments, a release agent (not shown) may be coated on the center conductor 112 and/or on the outer surface of the optical fiber 132 in order to facilitate separating the optical fiber 132 from the center conductor 112 and/or the dielectric spacer 114 in the event that the composite communications cable 100 is later used as a fiber optic cable instead of as a coaxial cable. In embodiments where the optical fiber(s) 132 are spaced apart from the center conductor 112, the dielectric spacer 114 may, for example, have two longitudinal channels 115-1, 115-2 as shown in FIG. 4A, or may have a single longitudinal channel 115-3 with a non-circular transverse cross-section as shown in FIG. 4B. The coaxial transmission component 110 and the fiber optic transmission component 130 may both be encased within a protective jacket 120.

As noted above, the composite communications cables of the '185 application, such as cable 100, may initially be used as coaxial cables, and may then later be upgraded for use as fiber optic cables. When initially installed, standard coaxial connectors such as F-style coaxial connectors may be used to connectorize the composite communications cables 100. These connectors, however, do not connectorize the optical fiber(s) that are included in the composite communications cables 100, and hence connectors are needed that may be used to connect the optical fibers in the composite communications cables 100 to other components of the communications network such as tap units, network interface units and the like.

Pursuant to embodiments of the present invention, connectors are provided that may be used to, for example, connectorize the optical fiber(s) that are included in, for example, the composite communications cables of the '185 application (e.g., composite communications cable 100) or other composite fiber optic/coaxial communications cables. Systems and methods of connectorizing and converting such composite communications cables 100 from use as coaxial cables to use as fiber optic cables are also provided. In some embodiments, the fiber optic connectors may comprise compression-type connectors that connectorize the optical fibers in the composite communications cable 100. These connectors may be attached to a ground plate or other mounting structure in order to ground at least the outer conductor 118 of the coaxial portion 110 of the composite communications cable 100. During the connectorization process, the optical fiber(s) 132 may be separated from the center conductor 112 of the coaxial component 110 inside the connector so as to reduce the possibility that the center conductor 112 damages the optical fiber(s) 132. The optical fiber(s) 132 are fed through the connector and heat shrink tubing and/or furcation tubing may be used to transition the optical fiber(s) 132. One or more of the coaxial components 110 of the composite communications cable 100 such as the outer conductor 118 may be used for strain relief purposes. In some embodiments, a female thread may be provided on the connector that has one or two "D" flats that are positioned in mating slots on the ground plate. A jam nut is used to secure and ground the outer conductor 118 of the composite communications cable 100. The "D" flats secure the connector in the ground plate so as to prevent the connector from rotating as the jam nut is tightened. In this fashion, the composite communications cable 100 can be readily transitioned from operating as a coaxial cable to operating as a fiber optic cable while providing strain relief and proper grounding of the coaxial components 110 and also protecting the optical fiber(s) 132 from damage.

Figure 5:
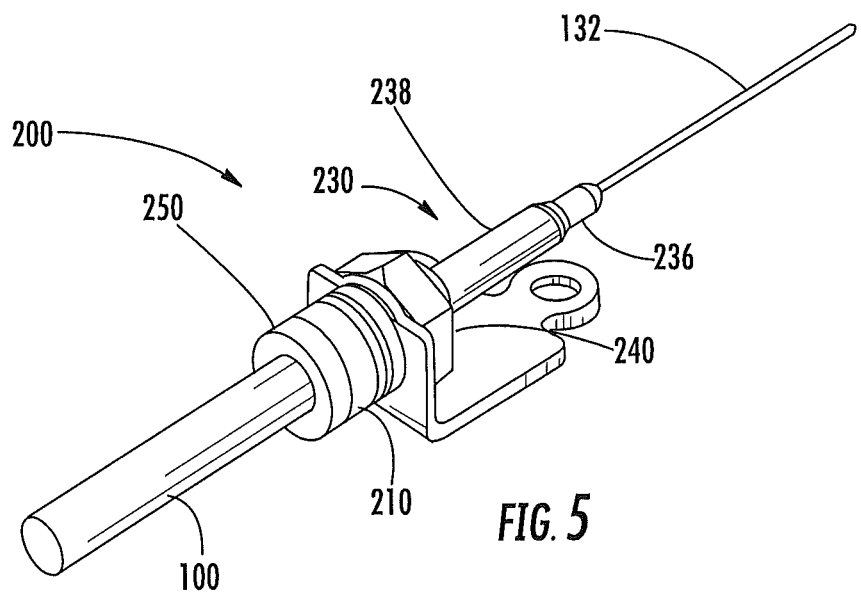
FIG. 5 is a perspective view of a fiber optic connector according to embodiments of the present invention mounted onto a ground plate.
Figure 6:
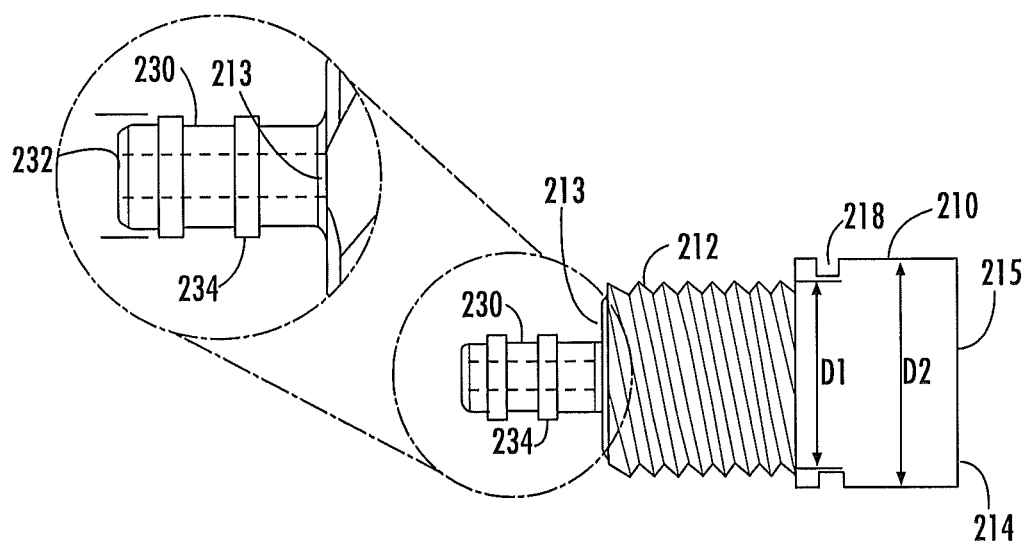
FIG. 6 is a side view of the fiber optic connector of FIG. 5 with a call-out illustrating the optical fiber passage of the fiber optic connector in greater detail.
Figure 7:
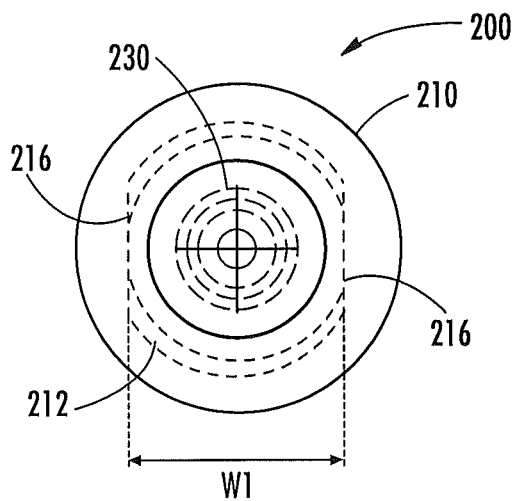
FIG. 7 is a front end view of the fiber optic connector of FIG. 5.
Figure 8:
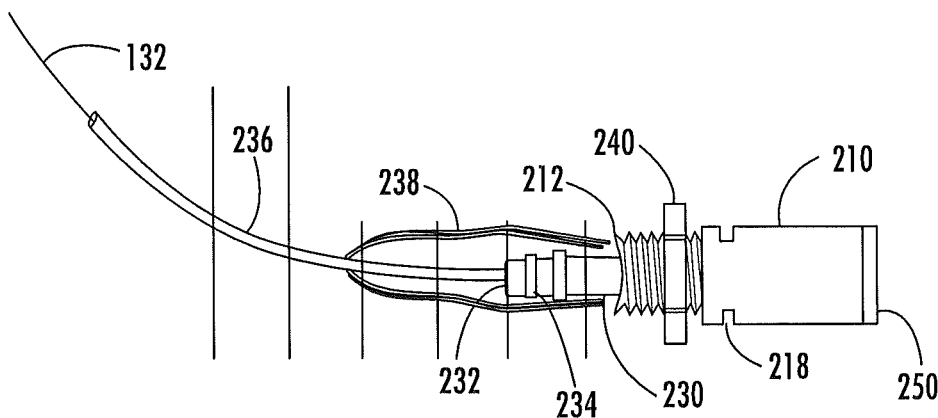
FIG. 8 is a side view of the connector of FIG. 5 that schematically illustrates how a furcation tube may be attached to the connector via heat shrink tubing.
Figure 9:
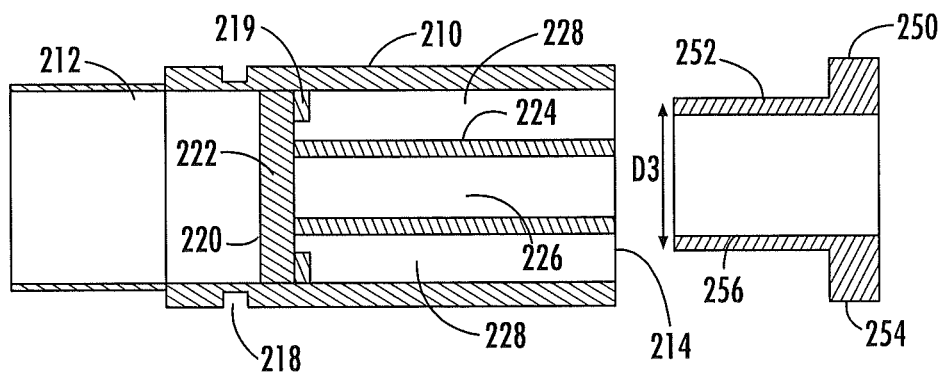
FIG. 9 is a cross-sectional view of the back portion of the fiber optic connector of FIG. 5 that illustrates a contact post that is mounted within the interior of the connector.

FIGS. 5-9 illustrate a fiber optic connector 200 according to embodiments of the present invention. In particular, FIG. 5 is a schematic perspective view of a fiber optic connector 200 after the connector 200 has been used to terminate the composite communications cable 100 of FIGS. 3-4. FIG. 6 is a side view of the connector 200 of FIG. 5 (with the compression sleeve omitted) before the connector 200 has been used to terminate the composite communications cable 100. FIG. 7 is an end view of the connector 200 (looking into the front end thereof). FIG. 8 is a side view of the connector 200 that schematically illustrates how a furcation tube may be mounted on an optical fiber that is connectorized using connector 200 and held in place via heat shrink tubing. Finally, FIG. 9 is a cross-sectional view of the back portion of connector 200 that illustrates a contact post that is mounted within the interior of connector 200.

As shown in FIGS. 5-9, the connector 200 includes a connector body 210, a contact post 220 (see FIG. 9), an optical fiber passage 230, a jam nut 240 and a compression sleeve 250. The connector 200 may be manufactured as a one-piece connector that is shipped from the factory as a single integrated unit. However, in at least some embodiments the compression sleeve 250 may be fully detached from the remainder of the connector 200 during the installation process that is used to install the connector 200 on the end of a communications cable such as communications cable 100. This may allow an installer to slide the compression sleeve 250 back along the cable 100 and out of the way during the installation process so that the installer may more easily align the cable 100 when inserting it within the connector body 210 during the installation process, as will be described in greater detail below. It will be appreciated, however, that in some embodiments the compression sleeve 250 may not be removable, such as, for example, in embodiments which use an external compression sleeve that fits over the connector body. It will also be appreciated that in still other embodiments the connector 200 may be shipped from the factory as a two-piece connector.

The connector body 210 comprises a hollow tubular member that has a front end 212 and a rear end 214. An aperture 213 is provided at the front end 212, and an aperture 215 is provided at the rear end 214. The apertures 213, 215 define the front and rear openings to a central channel that runs through the connector body 210. The front end 212 may be generally cylindrical in shape and may have a first diameter D1 and be externally threaded. One or two "D-flats" 216 (see FIG. 7) may be milled into sides of the threaded front section 212. The rear end 214 may also be generally cylindrical in shape and may have a diameter D2 that is greater than the diameter D1 of the front end 212. The rear end 214 may have a circular external groove 218. This external groove 218 may receive an arm of a compression tool that is used to attach the connector 200 to an end of the composite communications cable 100. The connector body 210 may be formed of a conductive material such as, for example, brass. While not shown in the figures, a dielectric member may be press fit within the front end 212 of connector body 210.

As shown best in FIG. 9, the contact post 220 is received within the central channel of the connector body 210. In some embodiments, the contact post 220 may be press fit within the connector body 210 through the aperture 213 in the front end 212. The contact post 220 includes a base 222 and a column 224 that extends rearwardly from the base 222. A central aperture 226 extends through both the base 222 and column 224. The rear surface of the base 222 may abut an internal protrusion 219 of the connector body 210. An annular chamber 228 is provided between the exterior surface of the column 224 and the interior surface of the connector body 210. The contact post 220 may also be formed of a conductive material such as, for example, brass.

The optical fiber passage 230 comprises a cylindrical tube that extends from a forward portion of the externally threaded front end 212 of connector body 210. The optical fiber passage 230 may have a hollow interior that may serve as a passage 232 for an optical fiber. The exterior surface of the optical fiber passage 230 may include one or more raised features 234 such as the two annular ridges 234 depicted in FIGS. 6 and 8. The optical fiber passage 230 may include an enlarged base member (not visible in the figures) that may be press fit within the front end 212 of connector body 210.

The compression sleeve 250 (see FIGS. 5 and 9) may comprise a conventional annular compression sleeve for an F-style coaxial connector. The compression sleeve 250 may be formed of, for example, metal, plastic or another polymeric material. The compression sleeve 250 has a front end 252, a rear end 254 and a central passage 256 therebetween that may receive the composite communications cable 100. The front end 252 of the compression sleeve 250 may have an external diameter D3 that is less than diameter D2, and the rear end 254 may have an external diameter that is, for example, equal to diameter D2. The compression sleeve 250 may be received within the rear end 214 of the connector body 210 in order to attach the cable 100 to the connector 200, as will be explained in greater detail below.

The jam nut 240 may comprise, for example, a ⅜ inch hexagonal nut. The jam nut 240 may be threaded onto the externally threaded front end 212 of the connector body 210 in order to mount the connector 200 to a mounting surface, as will be explained in greater detail below.

Figure 10:
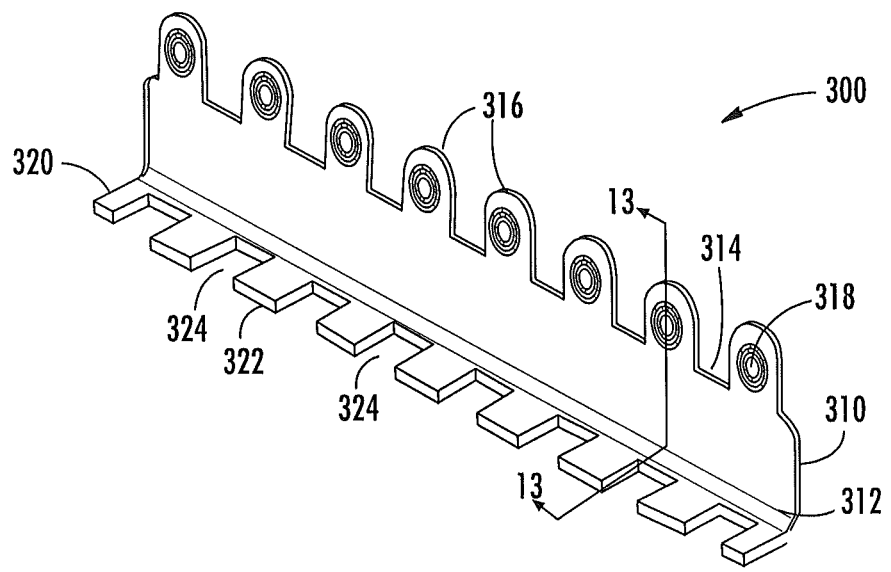
FIG. 10 is a perspective view of a ground plate according to embodiments of the present invention.
Figure 11:
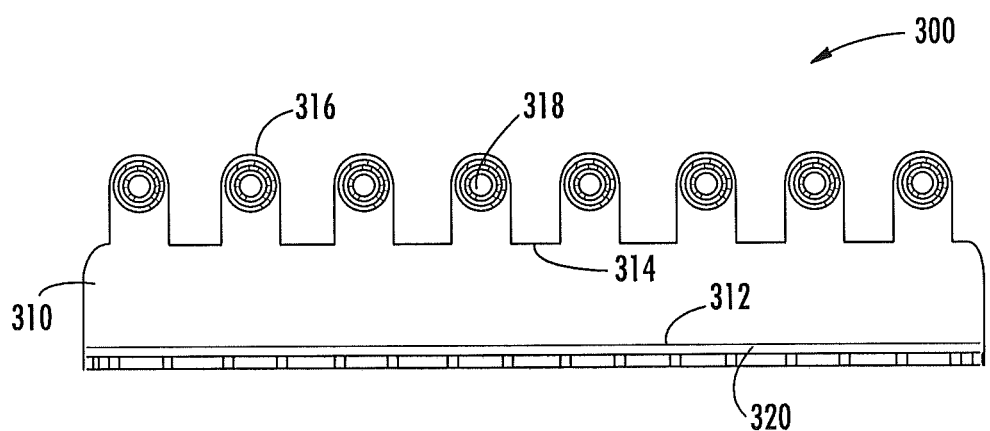
FIG. 11 is a top view of the ground plate of FIG. 10.

FIGS. 10-15 illustrate a ground plate 300 according to embodiments of the present invention. A plurality of the connectors 200 may be mounted on the ground plate 300, as shown in FIGS. 15A-15B. FIG. 10 is a perspective view of the ground plate 300, FIG. 11 is a top view of the ground plate 300, FIG. 12 is a front view of the ground plate 300, FIG. 13 is a cross-sectional view taken along the line 13-13 of FIG. 10, and FIG. 14 is an enlarged view of a top portion of FIG. 13. The ground plate 300 may be deployed, for example, at an optical tap unit of a fiber optic network, as will be discussed in greater detail herein. FIGS. 15A and 15B are perspective views illustrating two of the connectors 200 of FIGS. 5-9 mounted in the ground plate 300 of FIGS. 10-14. In particular, FIG. 15A illustrates two of the connectors 200 in the ground plate 300 before composite communications cables have been terminated into the connectors 200. FIG. 15B illustrates the connectors 200 with communications cables 100 terminated therein. In FIGS. 15A and 15B, one of the connectors 200 is illustrated before the jam nut 240 has been installed to lock the connector 200 into its corresponding slot 324 on ground plate 300 to better illustrate how the connectors 200 are mounted.

As shown in FIGS. 10-14, the ground plate 300 includes a laterally extending base plate 310 and a mounting plate 320 that extends upwardly from the base plate 310 at, for example, a ninety degree angle. The base plate 310 and the mounting plate 320 may each be made of an electrically conductive material such as, for example, brass. The base plate 310 and the mounting plate 320 may comprise two separate pieces that are joined together or may comprise an integral piece that is, for example, bent to form the base plate 310 and the mounting plate 320. The base plate 310 may comprise a generally planar sheet of metal that has a first edge 312 that joins to the mounting plate 320 and a second, distal edge 314 that is opposite the first edge 312. A plurality of fingers 316 extend from the distal edge 314. Each finger 316 may include a central aperture 318 therethrough. As shown in FIG. 14, the regions of the base plate 310 around the central apertures 318 may be thickened, and each central aperture 318 may include internal threads 319. As discussed below, the center conductor 112 may be terminated into aperture 318 to ground the center conductor 112. The ground plate 300 may be electrically connected to a reference voltage such as, for example, earth ground.

Figure 15A:
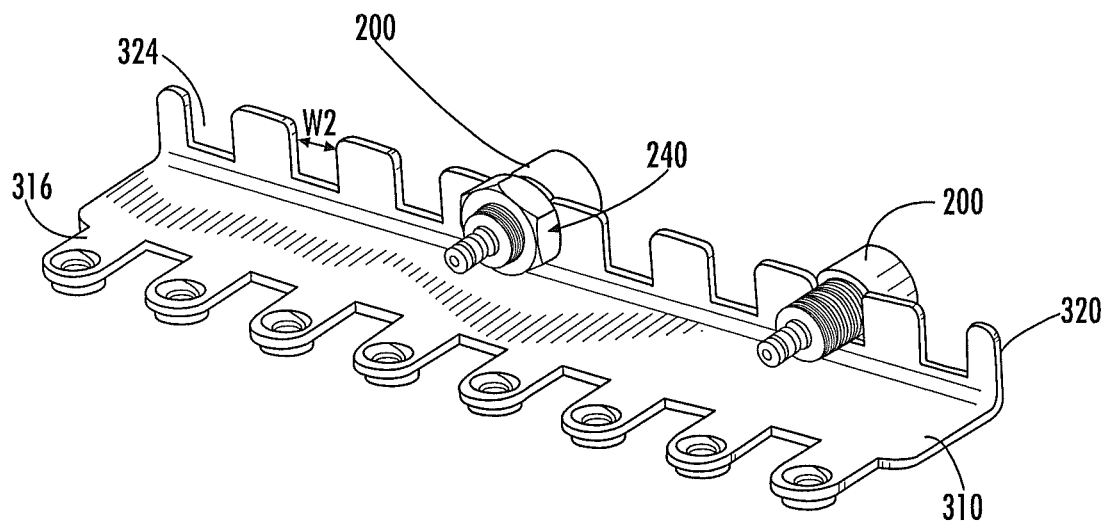
FIGS. 15A and 15B are perspective views of two of the fiber optic connectors of FIG. 5 mounted on the ground plate of FIG. 10.
Figure 15B:
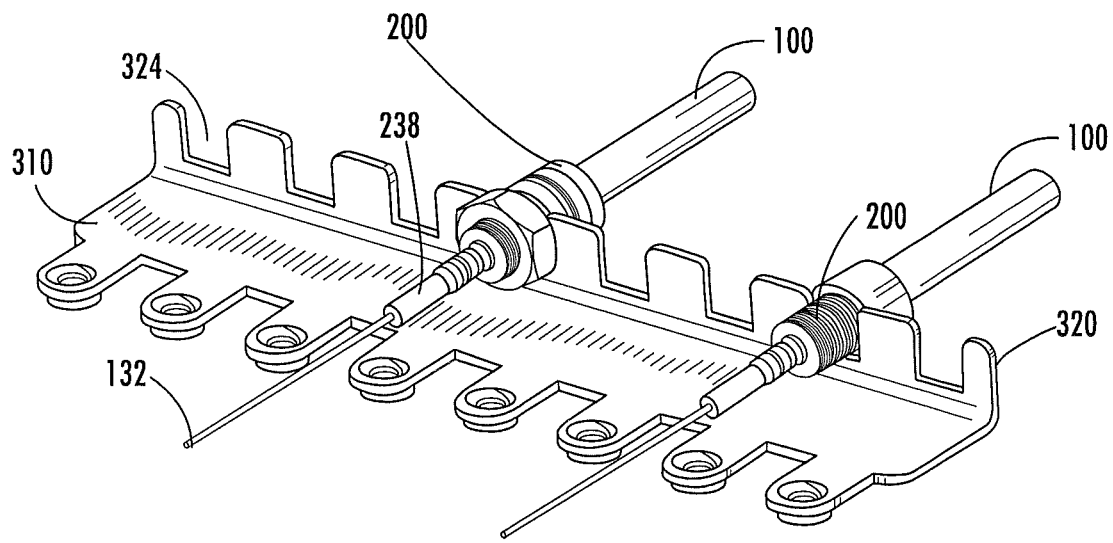

The mounting plate 320 includes a plurality of fingers 322 that define a plurality of slots 324 therebetween. As shown in FIGS. 15A-15B, one (or more) of the connectors 200 may be mounted in each of the slots 324. As noted above, the externally-threaded front end 212 of connector body 210 has D-flats 216 on either side thereof. As the D-flats 216 comprise milled-out sections of the external threads, the cross-sectional width of the externally threaded front section 212 of the connector body 210 from one D-flat 216 to the other D-flat 216 has a width W1 (see FIG. 7) that is less than diameter D1 (see FIG. 6). As shown in FIG. 15A, the slots 324 may be sized to have a width W2 that is slightly larger than the width W1. Consequently, the D-flats 216 of the externally-threaded front end 212 of connector body 210 may be received snugly within the slot 324, but the rear end 214 of connector body 210 will not fit through the slot 324.

The jam nut 240 may be threaded onto the threaded front end 212 of connector 200 so that the mounting plate 320 is tightly captured between the jam nut 240 and the wider-diameter rear end 214 of connector body 210, thereby securely mounting connector 200 in the slot 324 of ground plate 300.

As noted above, the outer conductor 118 of the composite cable 100 is received within the annular chamber 228 between the external surface of the column 224 of contact post 220 and the interior surface of the connector body 210. As such, the outer conductor 118 is in electrical contact with the connector body 210, which is made of an electrically conductive material such as, for example, brass. The connector body 210 is in electrical contact with the mounting plate 320 once the connector 200 is mounted in one of the slots 324 in the mounting plate 320. Thus, the ground plate 300 provides an electrical path to ground for the outer conductor 118 of the composite cable 100.

While the ground plate 300 depicted in FIGS. 10-15 includes a plurality of fingers 322 and slots 324 and hence is appropriate for use at devices where multiple connections may occur such as, for example, at tap units, it will be appreciated that the ground plate 300 may be designed to accommodate any appropriate number of connectors. For example, at individual subscriber premises the ground plate 300 may be designed to receive a single connector and may include, for example, only a single slot 324.

As will be discussed in greater detail below, the composite communications cable 100 is prepared prior to installation of the fiber optic connector 200 thereon by stripping away and/or cutting off 18-24 inches or more of the cable jacket 120, the outer conductor 118, the dielectric spacer 114 and the center conductor 112 so that about 18-24 inches (or more) of the optical fiber 132 extend beyond the remaining components of the cable 100. In some embodiments, the center conductor 112 may be cut to extend slightly beyond the dielectric spacer 114, and the extending end portion of the center conductor 112 may be capped with an insulative protective cap (to, for example, protect the optical fiber 132 from damage by the center conductor 112). In some embodiments, the end of the center conductor 112 may extend into the connector body 210. In other embodiments, approximately 3-6 inches of center conductor 112 may extend beyond the ends of the dielectric spacer 114, outer conductor 118 and jacket 120. This allows the end of the center conductor 112 to extend through the front opening 213 in connector body 210. In such embodiments, the center conductor 112 may be terminated into the aperture 318 in the finger 316 of base plate 310 that is adjacent the slot 324 that holds connector 200. In this fashion, the center conductor 112 may be grounded as well as the outer conductor 118. In some embodiments, the optical fiber passage 230 may include a first passage 232 that the optical fiber 132 of cable 100 extends through and a second aperture that the center conductor 112 extends through. The provision of two separate apertures 232 helps separate the center conductor 112 from the optical fiber 132, which may reduce the likelihood that the center conductor 112 damages the optical fiber 132.

Figure 16:
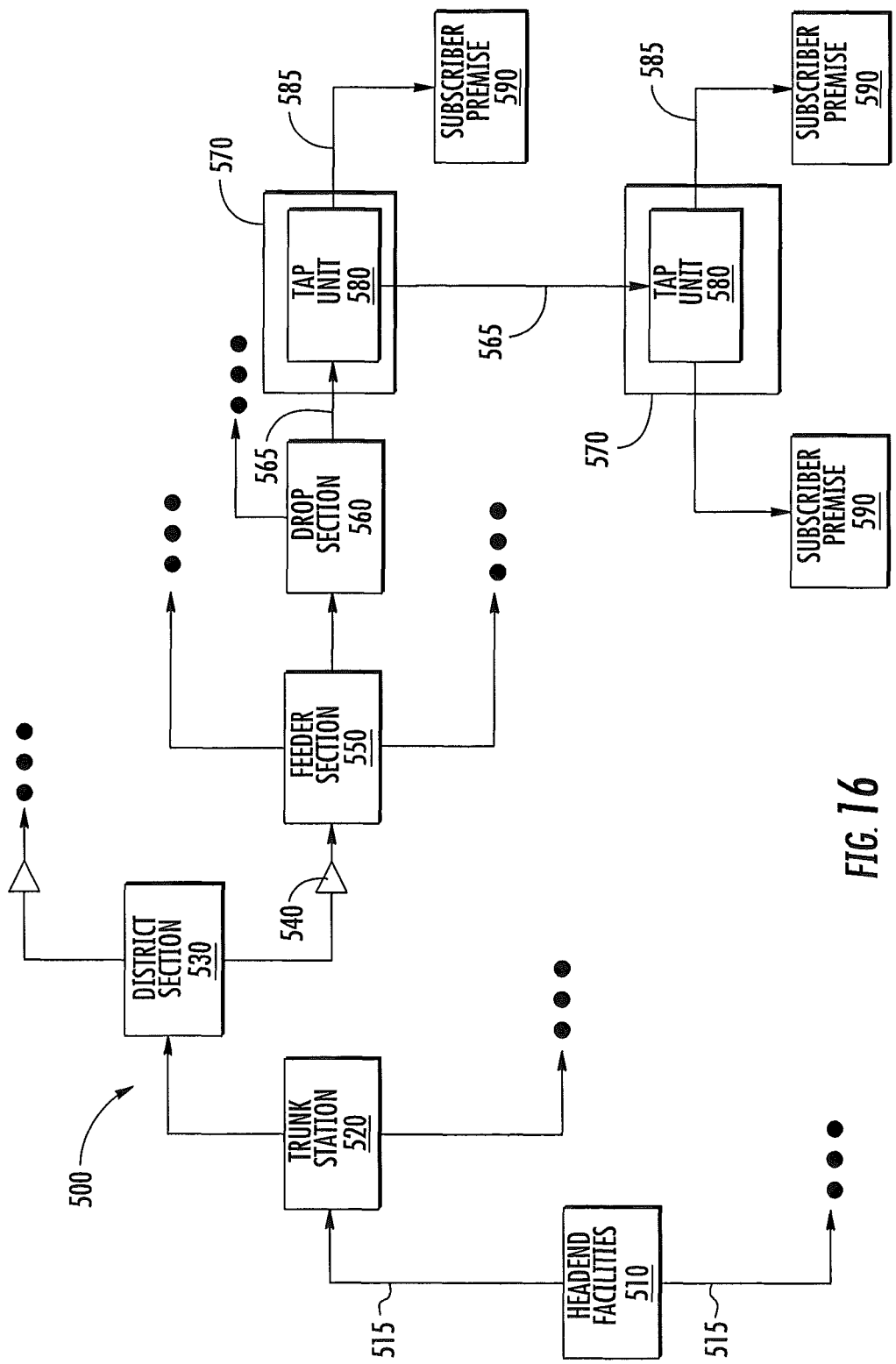
FIG. 16 is a schematic block diagram of a cable television network according to embodiments of the present invention.

FIG. 16 is a schematic block diagram of a cable television network 500 in which the connectors, connectorized cables and methods according to embodiments of the present invention may be used. As shown in FIG. 16, the cable television network 500 includes headend facilities 510 where signals (e.g., broadcast and other signals) from various sources, such as transmissions from satellites, microwave, fiber optic and other sources, are gathered and processed for transmission over the cable television network

500. These signals are distributed via a main or "trunk" network 515 to trunk stations 520. The signals may be further distributed from each trunk station 520 to a plurality of district sections 530, where the signals are typically amplified by amplification units 540. Each district section 530 may feed a plurality of feeder sections 550. In many cable television networks, the signals that are passed between the headend facilities 510 and subscriber premises may be passed as optical signals over fiber optic cables through the trunk stations 520, the district sections 530 and the feeder sections 550.

Each feeder section 550 may feed a plurality of drop sections 560. In many cable television networks, optical network interface units may be provided in the drop sections 560 that convert downstream optical signals from the headend facilities 510 into electrical RF signals and that convert upstream RF signals from the subscriber premises into optical signals. Coaxial "drop" cables 565 are connected to the output of each drop section 560 and are routed through neighborhoods and the like, and a plurality of distribution and amplification systems 570 are provided that connect individual subscriber premises 590 to the cable television network 500. As shown in FIG. 16, each distribution and amplification system 570 includes a tap unit 580 that may provide connections to one or more subscriber premises 590. Typically, the tap units 580 are located outside near the subscriber premises 590 (i.e., on the outside of a building, in a cable box near the street, etc.). Drop cables 585 are provided that connect each subscriber premise 590 to a tap port on one of the tap units 580.

Figure 19:
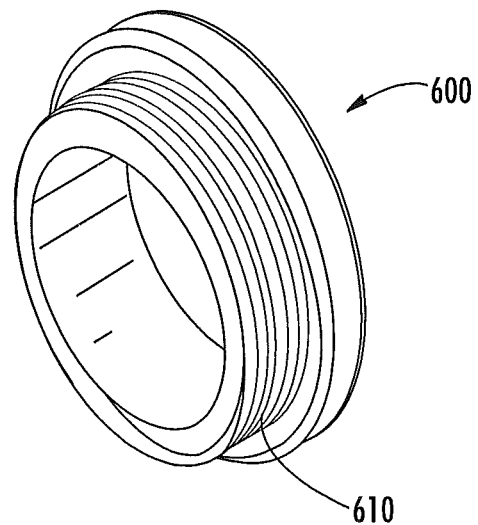
FIG. 19 is a perspective view of a cable hubcap according to embodiments of the present invention.

The drop cables 565 may be composite communications cables such as cable 100 that is described above. Conventional F-style coaxial connectors may be installed on each end of each drop cable 565 in order to allow the network side of each drop cable 565 to be connected to, for example, a coaxial connector provided on network equipment at the drop sections 560, and to allow the subscriber side of each drop cable 565 to be connected to, for example, a coaxial connector port on a tap unit 580. Likewise, the drop cables 585 that extend from the tap units 580 to the individual subscriber premises 590 may comprise composite communications cables 100. Conventional F-style coaxial connectors may also be installed on each end of each drop cable 585 in order to allow the network side of each drop cable 585 to be connected to, for example, a coaxial connector tap port on a tap unit 580, and to allow the subscriber side of each drop cable 585 to be connected to, for example, a coaxial connector RF input port on a signal amplifier or other unit at a subscriber premise 590. When the drop cables 565, 585 are first installed, the installer would leave approximately 2-3 feet of excess cable on each end of the drop cable 565, 585, which excess cable is typically coiled in a so-called "slack loop." In some embodiments, a cable storage unit such as the cable hub cap 600 of FIG. 19 may be provided and the excess end portion of cable 100 that comprises the slack loop may be wound around the cable hub cap 600 in the grooves 610. Providing this excess cable at each end of the drop cables 565, 585 facilitates later upgrading the network to have fiber-to-the-home connectivity, as will become apparent from the description below. Initially, however, the cable television network 500 is operated in a conventional manner as a hybrid fiber-coaxial network with RF (coaxial) connections from, for example, the drop sections 560 to the subscriber premises 590 using the coaxial transmission components 110 of the composite communications drop cables 100.

Methods of converting the drop cables 585 of FIG. 16 (which, as noted above, may be implemented using the composite communications cable 100 of FIGS. 3-4) from operating as coaxial cables to operating as fiber optic cables will now be described with reference to FIGS. 5-16. It will be appreciated that the same technique may be used to convert the drop cables 585 of FIG. 16 from operating as coaxial cables to operating as fiber optic cables.

When operating as a coaxial cable, each end of the composite communications cable 100 may be terminated with a conventional coaxial connector such as, for example, any of a wide variety of F-style coaxial connectors that are known in the art. As discussed above with reference to FIG. 16, the composite communications cable 100 would typically serve as a drop cables 565, 585 that connect two RF tap units 580 or that connect a tap unit 580 to a subscriber premise 590. In order to upgrade the subscriber premise 590 to have fiber-to-the-home connectivity, the RF tap unit 580 that previously provided connectivity to the subscriber premise 590 would be replaced with an optical tap unit 580. Likewise, the connection point (e.g., an input port of a signal amplifier) that received the far end of the drop cable 585 at the subscriber premise 590 would be replaced with a network interface unit (not shown).

In order to connect the drop cable 100 to the optical tap unit 580 and the network interface unit, it is necessary to convert the terminations on the cable 100 from coaxial cable connections to fiber optic connections. To accomplish this, a technician may first simply cut off the F-style coaxial connector on a first end of the composite communications cable 100 (e.g., the end of cable 100 that is connected to the tap unit 580). The installer may then detach the compression sleeve 250 from the remainder of the connector 200 (the compression sleeve 250 may be held in place inside the connector 200 using, for example, an annular ridge and groove connection that may allow the compression sleeve 250 to be detached and then reattached inside the connector body 210). Once the compression sleeve 250 is detached, the installer may place the compression sleeve 250 onto the end of composite communications cable 100, and slide the compression sleeve 250 several feet down the composite communications cable 100 so that is out of the way. Next, the installer may strip off approximately the last 18-24 inches of the cable jacket 120, the electrical shield 118, the tape 116, the dielectric spacer 114 and the center conductor 112, so that the optical fiber 132 extends approximately 18-24 inches from the end of the rest of the cable 100. The above-described slack loop that is provided at either end of drop cables 565, 585 provides the excess cabling that allows the installer to strip away various portions of the end of each cable 100. The installer may use a stripping tool to strip off these elements of cable 100. Adequate care should be exercised so that the optical fiber 132 is not damaged during the stripping operation. FIGS. 20A-20J illustrate how a pair of stripping tools may be used to perform this stripping operation. An insulative cap may be placed on the end of the center conductor 112 in order to reduce the likelihood that a sharp edge of the cut end of the center conductor 112 damages the optical fiber 132. The cable jacket 120 and electrical shield 118 are then prepared by removing an additional end portion of the jacket 120 so as to expose the electrical shield 118. The electrical shield 118 is folded back along the cable jacket 120 to expose the dielectric spacer 114, as is conventional with respect to termination of a coaxial cable into an F-style coaxial connector.

Figure 20A:
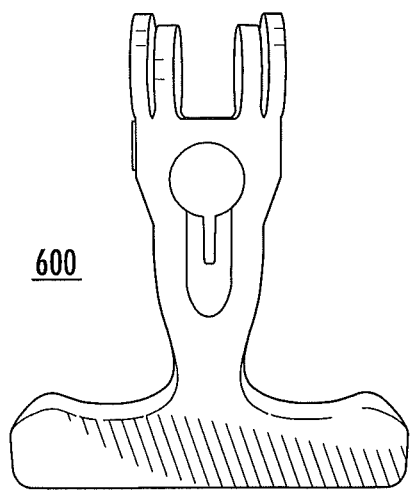
FIGS. 20A-20J are perspective views illustrating how a pair of stripping tools may be used to expose an optical fiber of the composite communications cable of FIG. 3.
Figure 20B:
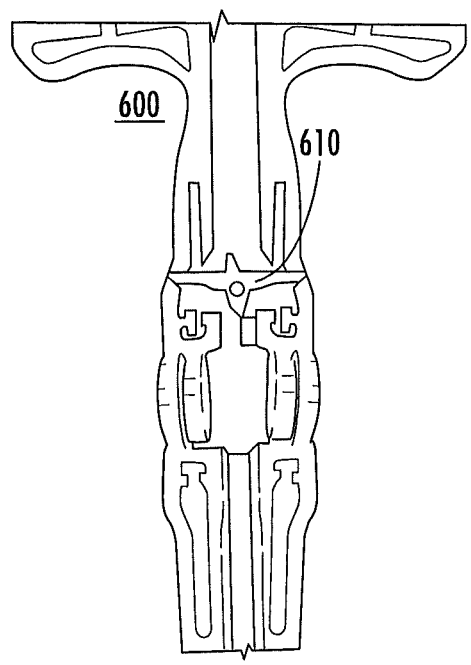
Figure 20C:
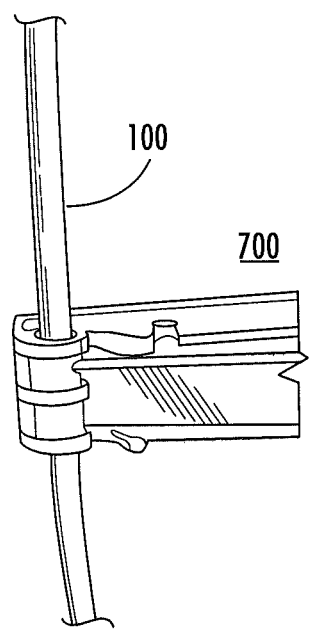
Figure 20D:
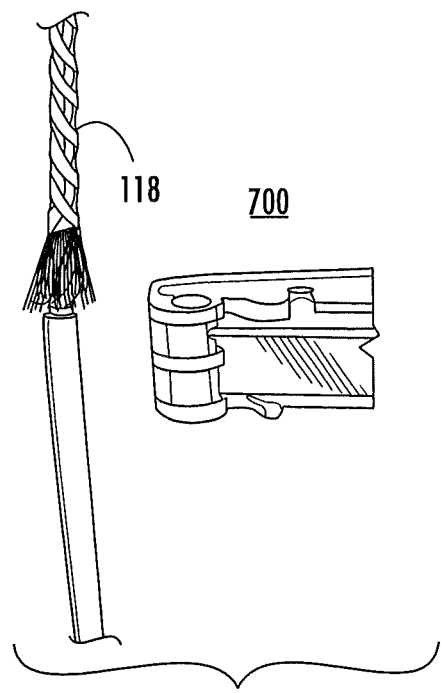
Figure 20E:
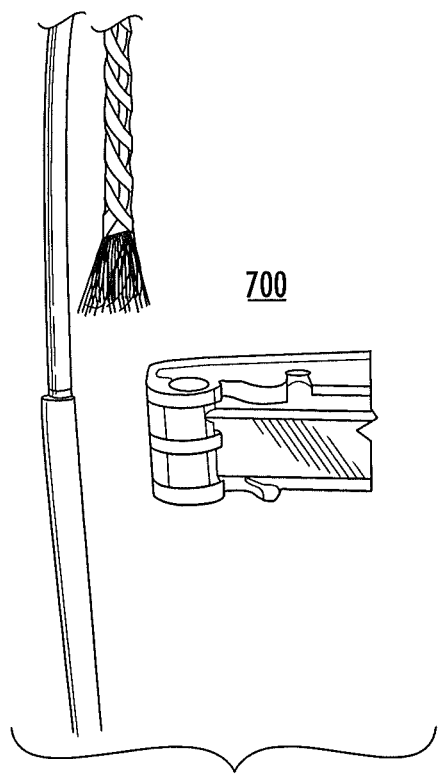
Figure 20F:
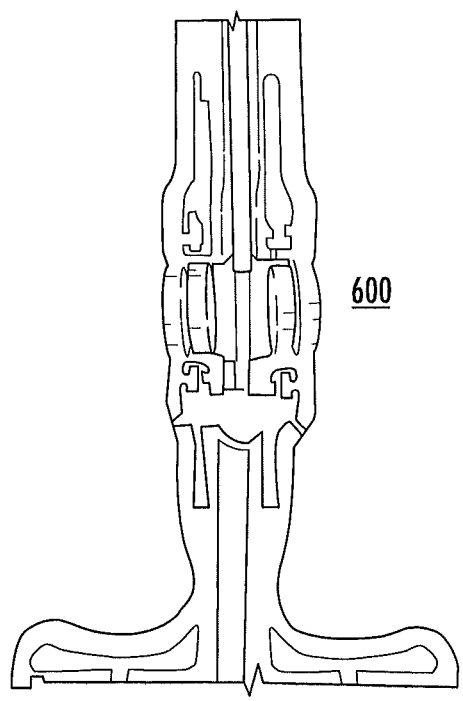
Figure 20G:
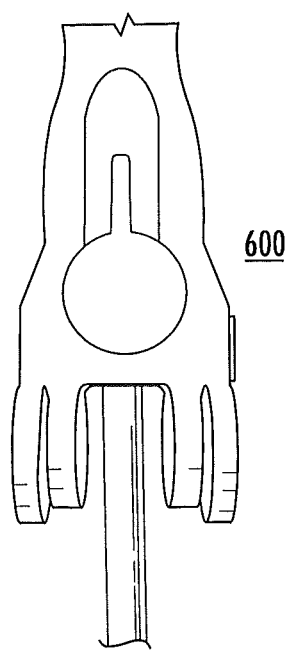
Figure 20H:
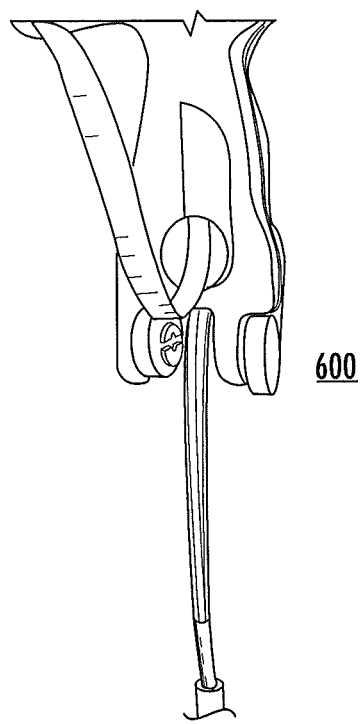
Figure 20I:
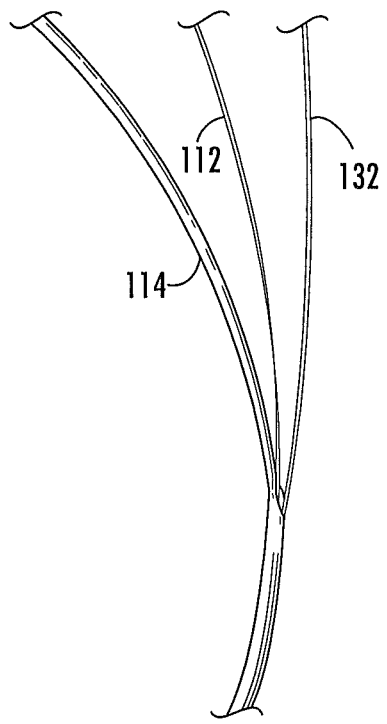
Figure 20J:
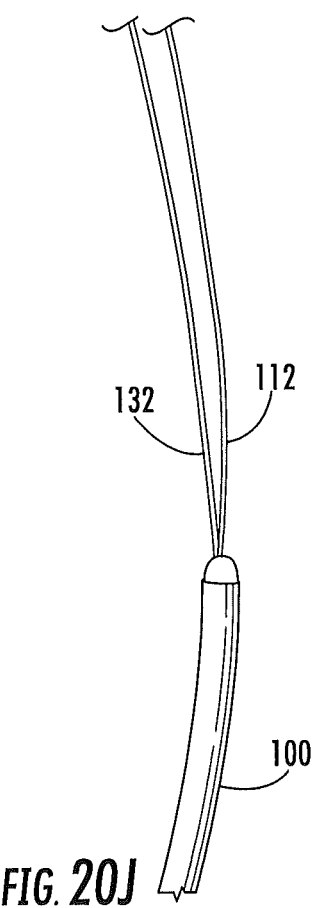

Referring now to FIGS. 20A-20J, FIGS. 20A and 20B illustrate a stripping tool according to further embodiments of the present invention that may be used to expose and separate the optical fiber from the composite communications cable 100 of FIG. 3. In particular, FIG. 20A is a top perspective view of the stripping tool 600 and FIG. 20B is an enlarged bottom perspective view of the stripping tool 600 that shows a blade 610 that is used to cut through the dielectric spacer 114 of the composite cable 100. As shown in FIGS. 20C and 20D, a conventional coaxial cable stripping tool 700 may be used to cut through the jacket 120 and outer conductor 118 of the cable 100. As shown in FIG. 20E, the cut portions of the jacket 120 and the outer conductor 118 may then be removed to expose the dielectric spacer 114. As shown in FIGS. 20F and 20G, the composite communications cable 100 may then be placed in the stripping tool 116 and the blade 610 may be used to cut through the exposed portion of the dielectric spacer 114. Referring to FIGS. 20H and 20I, the cut dielectric spacer may then be stripped away to expose the center conductor 112 and the optical fiber 132. Finally, as shown in FIG. 20J, the stripped portion of the dielectric spacer 114 may be cut off to leave the center conductor 112 and the optical fiber 132 exposed.

Next, the optical fiber 132 may be inserted into the rear end of the connector body 210 and carefully threaded through the connector body 210, the center passage 226 of the contact post 220 and the aperture 232 through the optical fiber passage 230 so that most of the free portion of the optical fiber 132 extends out of the front opening of the optical fiber passage 230. Next, the installer may insert the prepared end of the cable 100 (i.e., the end portion of the cable 100 where the cable jacket 120 and electrical shield 118 have been folded back along the cable) into the rear end 214 of connector body 210. The center conductor 112 and the exposed portion of the dielectric spacer 114 are received within the central passage 226 of the contact post 220, while the electrical shield 118 and the cable jacket 120 are received within the annular chamber 228 between the exterior surface of the column 224 of the contact post 220 and the interior surface of the connector body 210. The installer then slides the compression sleeve 250 along the cable 100 and into the rear end 214 of the connector body 210. The installer may then use a conventional compression tool to force the compression sleeve 250 into its seated position within the rear end 214 of the connector body 210. The compression sleeve 240 exerts a generally circumferential transverse force on the electrical shield 118 and the cable jacket 120 that locks the cable 100 within the connector body 210.

Next, the furcation tube 236 is placed over the end of the optical fiber 132 and slid along the optical fiber 132 until it comes into contact with the optical fiber passage 230. A heat shrinkable tube or wrap 238 is also placed over the end of the optical fiber 132 and slid along the optical fiber 132 until it covers at least a portion of the furcation tube 236 and at least a portion of the optical fiber passage 230. The heat shrinkable tube 238 is then subject to a heat treatment to hold the furcation tube 236 in place next to the optical fiber passage 230.

The 18-24 inches of optical fiber 132 that extends from the front end of the optical fiber passage 230 may then be looped at an appropriate bend radius in a fiber tray at the tap unit 580. The end of the optical fiber 132 may be connected via a fuse splice to, for example, an optical fiber pig tail of the tap unit 580. A similar process may be performed at the network interface unit that was installed at the subscriber premise 590 to connectorize the other end of the cable 100 with a fiber optic connector 200 and to then fusion splice the optical fiber 132 to a pig tail fiber at the network interface unit. This then completes the fiber optic connection all the way to the subscriber premise 590. Typically, the slack loops on each end of the cables 100 will be long enough to allow for one additional connectorization of cable 100 (on each end thereof) in case a mistake during the initial installation of connector 200 or in the event that the connector 200 is later damaged and needs to be replaced.

Figure 17:
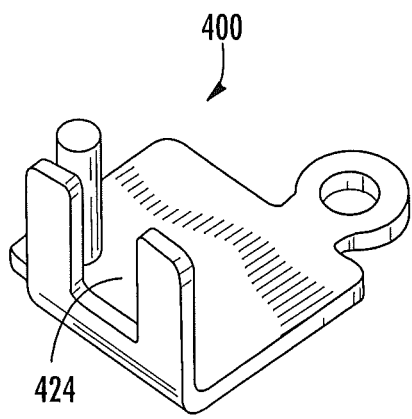
FIG. 17 is a perspective view of a ground plate according to further embodiments of the present invention.
Figure 18:
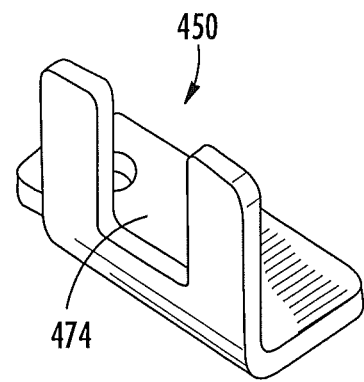
FIG. 18 is a perspective view of a ground plate according to still further embodiments of the present invention.

As noted above, at the tap unit 580, the connector 200 may be mounted into one of the slots 324 of the ground plate 300. The composite communications cable 100 may be connectorized with connector 200 either before or after the connector 200 is mounted in the ground plate 300. Ground plates may also be provided at the network interface unit and at the subscriber premise. FIGS. 17 and 18 illustrate two additional exemplary ground plates 400 and 450. The ground plates 400 and 450 are similar to the ground plate 300 discussed above, but only include a single slot 424, 474 as typically only a single cable 100 is routed to each network interface unit.

It will be appreciated that many modifications may be made to the above disclosed embodiments without departing from the scope of the present invention. For example, while the connector 200 includes an internal compression sleeve 250, it will be appreciated that in other embodiments an external compression sleeve may be used that is inserted over the rear end of the connector body and which crushes the connector body inward to capture the outer conductor 118 of cable 100 between the interior surface of the connector body and the exterior surface of the column of the contact post.

The present invention has been described above with reference to the accompanying drawings in which example embodiments are shown. It will be appreciated, however, that this invention may be embodied in many different forms and should not be construed as limited to the embodiments set forth herein; rather, these embodiments are provided so that this disclosure will be thorough and complete, and will fully convey the scope of the invention to those skilled in the art. Accordingly, it will be appreciated that many modifications may be made to the exemplary embodiments of the present invention described above without departing from the scope of the present invention. It will likewise be appreciated that the features and components of the various embodiments described above may be further mixed and matched to provide yet additional embodiments of the present invention.

In the drawings, the size and/or relative positions of lines and elements may be exaggerated for clarity. It will also be understood that when an element is referred to as being "coupled," "connected," or "attached" to another element, it can be coupled, connected or attached directly to the other element, or intervening elements may also be present. In contrast, when an element is referred to as being "directly coupled" "directly connected," or "directly attached" to another element, there are no intervening elements present.

Unless otherwise defined, all technical and scientific terms used herein have the same meaning as commonly understood by one of ordinary skill in the art to which this invention belongs. The terminology used in the description herein is for the purpose of describing particular embodiments only and is not intended to be limiting of the invention. As used in the description and the appended claims, the singular forms "a", "an" and "the" are intended to include the plural forms as well, unless the context clearly indicates otherwise. As used herein, the term "and/or" includes any and all combinations of one or more of the associated listed items.

This invention is directed, in part, to composite communications cables. As used herein, the term "longitudinal" and derivatives thereof refer to the lengthwise direction defined by the central axis of the cable when the cable is pulled taunt in a straight line. Herein, the terms "transverse plane" and "transverse cross-section" refer to a plane and cross-section, respectively, that are taken normal to the longitudinal direction.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of upgrading a coaxial cable cabling connection to a fiber optic cabling connection, the method comprising:
    removing a coaxial connector from a first end of a composite communications cable, the composite communications cable including:
        a cylindrical spacer;
        a center conductor coaxially centered within the cylindrical spacer;
        an outer conductor surrounding the cylindrical spacer;
        an outer jacket surrounding the outer conductor; and
        an unused optical fiber positioned within the outer jacket of the composite communications cable;
    exposing a first end portion of the optical fiber of the composite communications cable at the first end of the composite communications cable;
    inserting the first end of the composite communications cable into a compression connector so that the first end portion of the optical fiber extends through an optical fiber passage of the compression connector; and
    compressing a compression sleeve of the compression connector to lock the composite communications cable in place inside the compression connector;
    wherein the compression connector is optically connected to the first end portion of the optical fiber to convert a termination of the composite communications cable from a coaxial cable connection to a fiber optic connection without an electrical connection.

2. The method of claim 1, wherein the compression connector includes:
    a connector body; and
    a contact post mounted within the connector body that is configured to receive both a first end portion of the center conductor of the composite communications cable and the first end portion of the optical fiber,
    wherein the optical fiber passage extends from a front end of the connector body and the compression sleeve is received within a rear end of the connector body.

3. The method of claim 2, wherein the front end of the connector body includes external threads, the method further comprising threading a jam nut onto the external threads to mount the compression connector on a mounting structure.

4. The method of claim 3, wherein the optical fiber passage includes at least one external protrusion, the method further comprising mounting a furcation tube onto a front end of the optical fiber passage.

5. The method of claim 4, the method further comprising installing a heat shrinkable material over the external protrusion of the optical fiber passage and over at least a portion of the furcation tube.

6. The method of claim 1, wherein the outer conductor of the composite communications cable provides strain relief once the composite communications cable is locked in place inside the compression connector.

7. The method of claim 1, wherein the optical fiber passage includes first and second channels, the method further comprising passing the first end portion of the optical fiber through the first channel and passing the center conductor of the composite communications cable through the second channel.

8. The method of claim 2, wherein a furcation tube extends from a front end of the optical fiber passage, and wherein the center conductor of the composite communications cable extends through both the optical fiber passage and the furcation tube.

9. The method of claim 1, wherein the first end portion of the optical fiber exposed is from about 18 to about 24 inches.

10. A method of upgrading a coaxial cable cabling connection to a fiber optic cabling connection, the method comprising:
    removing a coaxial connector from a first end of a composite communications cable, the composite communications cable including:
        a cylindrical spacer;
        a center conductor coaxially centered within the cylindrical spacer;
        an outer conductor surrounding the cylindrical spacer;
        an outer jacket surrounding the outer conductor; and
        an unused optical fiber positioned within the outer jacket of the composite communications cable;
    exposing a first end portion of the optical fiber of the composite communications cable at the first end of the composite communications cable; and
    installing a fiber optic connector to the composite communications cable, wherein the fiber optic connector is optically connected to the first end portion of the optical fiber to convert a termination of the composite communications cable from a coaxial cable connection to a fiber optic connection without an electrical connection.

* * * * *